(12) United States Patent
Elmenhurst (10) Patent No.: US 7,031,519 B2
(45) Date of Patent: Apr. 18, 2006

(54) ORTHOGONAL TECHNOLOGY FOR CHARACTER RECOGNITION

(75) Inventor: Brian J. Elmenhurst, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 684 days.

(21) Appl. No.: 09/919,586

(22) Filed: Jul. 30, 2001

(65) Prior Publication Data

US 2002/0054693 A1    May 9, 2002

Related U.S. Application Data

(60) Provisional application No. 60/221,595, filed on Jul. 28, 2000, provisional application No. 60/221,695, filed on Jul. 31, 2000.

(51) Int. Cl.
*G06K 9/00* (2006.01)

(52) U.S. Cl. .................. 382/181; 382/101; 382/102

(58) Field of Classification Search ............... 302/101, 302/102, 229
See application file for complete search history.

(56) References Cited

U.S. PATENT DOCUMENTS 3,533,068 A    10/1970  Hanaki et al. ........... 340/146.3
3,641,495 A    2/1972   Kiji ..................... 340/146.3 R (Continued)

FOREIGN PATENT DOCUMENTS

JP       3212779        9/1991
JP       03229386 A  *  10/1991

(Continued)

OTHER PUBLICATIONS

PCT International Search Report dated Feb. 21, 2002 for International Application No. PCT/US01/24015.

(Continued)

*Primary Examiner*—Samir Ahmed
*Assistant Examiner*—Brian Le
(74) *Attorney, Agent, or Firm*—Stoel Rives LLP (57) ABSTRACT

The present invention encompasses a self-orthogonal character recognition engine for executing an iterative method employing a database of predetermined character strings. The method receives a digital representation of a character string. It then generates a proposed result string by applying to the captured digital image a predetermined recognition routine including one or more recognition subroutines. Each recognition subroutine employs an initial parameter setting. Next, if the proposed result string does not match any of the predetermined character strings in the database, the initial parameter setting of a recognition subroutine is changed to a next setting. The recognition process is then repeated using the next parameter setting to generate and test a next result string. The process can be repeated iteratively until a result string is verified or the process times out.

26 Claims, 5 Drawing Sheets

U.S. PATENT DOCUMENTS

| | | | |
|---|---|---|---|
| 3,764,980 A | 10/1973 | Dansac et al. | 340/146.3 ED |
| 4,132,978 A | 1/1979 | Mercier | 340/146.3 |
| 4,850,025 A | 7/1989 | Abe | 382/9 |
| 5,020,117 A * | 5/1991 | Ooi et al. | 382/185 |
| 5,197,107 A * | 3/1993 | Katsuyama et al. | 382/209 |
| 5,240,116 A * | 8/1993 | Stevens et al. | 209/534 |
| 5,280,531 A | 1/1994 | Hunter | 382/1 |
| 5,745,590 A | 4/1998 | Pollard | 382/101 |
| 5,787,202 A | 7/1998 | Ueno | 382/227 |
| 5,805,710 A | 9/1998 | Higgins et al. | 382/101 |
| 5,809,183 A | 9/1998 | Serizawa et al. | 382/301 |
| 6,041,141 A * | 3/2000 | Yamamoto et al. | 382/231 |
| 6,115,707 A * | 9/2000 | Shimomura | 707/6 |
| 6,859,556 B1 * | 2/2005 | Takebe et al. | 382/218 |

OTHER PUBLICATIONS

Sasi, et al., "Handwritten Character Recognition Using Fuzzy Logic," *IEEE* Paper ISBN: 0-7803-2428-5/95, 1995, pp. 1399-1402.

* cited by examiner

FIG. 2 – Demonstrating orthogonality of multiple iteration configurations for character recognition FIG. 3 – Demonstrating problems caused in character recognition results by splitting and joining of characters FIG. 4 – Demonstrating multiple results sets produced by multiple iterations of a self-orthogonal character recognition engine FIG. 5 – Demonstrating multiple iterations until a valid result string is achieved

ORTHOGONAL TECHNOLOGY FOR CHARACTER RECOGNITION

RELATED APPLICATIONS

This application claims priority from U.S. Provisional Patent Application Nos. 60/221,595 and 60/221,695, filed Jul. 28, 2000 and Jul. 31, 2000, respectively.

COPYRIGHT NOTICE

© 2001 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §§ 1.71(d) & (e).

TECHNICAL FIELD

The present invention relates to the field of automated character recognition processing and, in particular, to the use of a self-orthogonal character recognition engine and iterative method to improve character recognition results.

BACKGROUND OF THE INVENTION

In the field of automated character recognition processing, individual input pieces comprising an input stream undergo processing in order to identify characters or character strings contained within the input pieces. Characters can be alphabetic, numeric, symbolic, punctuation marks, etc., and they may be hand written or machine printed. Examples of typical input pieces can include data forms, mail envelopes, bank checks, or several other types of documents or items that have characters for recognition.

Depending on the particular type of input stream, a single character may be the subject of the recognition procedures, or several characters may be combined together into a character string that is to be recognized. The recognition process may occur using various well-know technologies. For example, with optical character recognition technology, a scanner is used to scan the light and dark areas of a character on the input piece and generate a corresponding digital representation of that character. In magnetic character recognition, a magnetic reader or sensor is used to create a digital representation of characters printed with magnetic ink.

In typical practice, character recognition processing generates result strings (strings of recognized characters) which are generally quite close to what is actually on the input piece. However, it is not unusual for character recognition processes to have uncertainty about some characters, or about the exact point of separation between characters. Sometimes, characters are incorrectly recognized, resulting in improper substitution, joinder, or separation of characters reported in the result string. A typical cause for error in a character recognition engine result string is poor quality or lack of clarity in the original input piece. Poor printing, sloppy handwriting, smearing, stray marks or lines, or printing atop of graphics, form background, or colored or shaded areas can all cause errors in the recognition process.

Manufacturers of character recognition engines have adopted various techniques to improve character recognition results. Existing techniques, however, have significant limitations. For example, one known technique is to generate multiple character possibilities for each potentially ambiguous character being recognized. A probability or confidence indication is then assigned to each result possibility. The character with the highest confidence is then selected for the result output. While this technique can improve results in many circumstances, picking the highest probability character does not always result in a correct result string. This technique generates result strings with a high probability of being correct, but it does not have the ability to verify the result string against objective standards.

Another known technique is to obtain a result string (such as a word) through recognition processing and then validate the result string against a database of known or acceptable result strings (such as a word dictionary or other type of "look-up" dictionary) to determine whether the result is valid. While this technique provides some measure of objective validation, it is limited in that the system querying the database only does so as a final step in the character recognition process. If a string is determined invalid, prior art character recognition engines cannot effectively adapt or attempt alternate recognition approaches to generate a valid character recognition result.

Some existing character recognition systems attempt to rescan or capture a new digital representation of the input piece if the character recognition procedure is unsuccessful with the first digital representation. The same character recognition procedure is then employed with the new digital representation. This technique also has significant limitations. Often when a character recognition engine is expected to process an input stream including numerous input pieces passing the digital capture mechanism at a great rate of speed, it is difficult to interrupt the input stream in order to re-route the input piece by the digital capture mechanism for generating a second digital representation. Further, the unsuccessful recognition process may be a result of the configuration of the system, and reprocessing a second image according to the same recognition procedure may not improve the results.

Finally, some systems operating under requirements of high recognition accuracy will use multiple character recognition engines, each conducting a separate recognition procedure, in an attempt to recognize successfully, on the whole, more characters than any one recognition engine could recognize functioning independently. This type of system benefits from the implementation of orthogonal technology. As used throughout this specification and the attached claims, the term "orthogonal" is used in the mathematical sense to refer to items that are not related or provide independent results. Because each recognition engine conducts a different recognition procedure, it may successfully recognize some of the input pieces that were unsuccessfully recognized by the other engines.

However, truly orthogonal systems are typically cost prohibitive. The licensing or operation costs associated with implementing additional recognition engines often makes true orthogonal systems impracticable. Also, consistent with the law of diminishing returns, with the addition of each new engine (and its associated cost), less and less overall benefit is obtained. While a first engine may successfully recognize the majority of the input pieces, a second engine may successfully recognize only a small fraction of the input pieces that were not successfully recognized by the first engine. A third engine, although it may cost the same as the other engines, may successfully recognize only a few images that were not recognized by either of the first two engines. Attempts to operate too many engines quickly becomes too cost prohibitive.

What is needed is a system and procedure for optical character recognition that captures the benefits of the above techniques without suffering from the corresponding limitations. The present invention fulfils this need.

SUMMARY OF THE INVENTION

An embodiment of the present invention encompasses a self-orthogonal character recognition engine. The self-orthogonal engine can execute an iterative character recognition method employing a database of predetermined character strings. The method begins by receiving a digital representation of a character string. It then generates a proposed result string by applying a predetermined recognition routine to the captured digital image. The predetermined recognition routine can include one or more recognition subroutines each employing an initial parameter setting. The initial parameter settings can be predetermined to optimize the results of the recognition process. Next, a determination is made as to whether the proposed result string matches any of the predetermined character strings in the database. If the results string matches a predetermined character string, it is accepted as a verified result of the recognition process. If the result string does not match any of the predetermined character strings, the initial parameter setting of a recognition subroutine is changed to a new setting. The recognition process is then repeated using the new parameter setting to generate and test a new result string. The process can be repeated until a result string is verified or the process times out.

An iterative process consistent with the present invention does not require the generation of a new digital representation of the character string for each new iteration. Also, it can operate on input pieces that include character strings spanning multiple lines of text. The character strings can also span multiple font types or sizes. This is referred to as "multi-line character recognition." One example of this is in the field of mail or postal processing. The input piece can be a piece of mail, the multi-line character string can be an address block, and the database can be a directory retrieval system (such as a database including valid mailing addresses).

Additional aspects and advantages of this invention will be apparent from the following detailed description of preferred embodiments thereof, which proceeds with reference to the accompanying drawings.

DETAILED DESCRIPTION OF PREFERRED EMBODIMENTS

The present invention relates to the use of a self-orthogonal character recognition engine performing an iterative method for increasing the accuracy of character recognition results. While the present invention can be embodied in numerous contexts, a preferred embodiment described herein is implemented in the context of an optical character recognition system for use with mail pieces. Those skilled in the art may readily ascertain that other recognition technologies, such as magnetic character recognition, as well as a plurality of other contexts for use, may also be adapted consistent with the present invention.

Figures 1, 6:
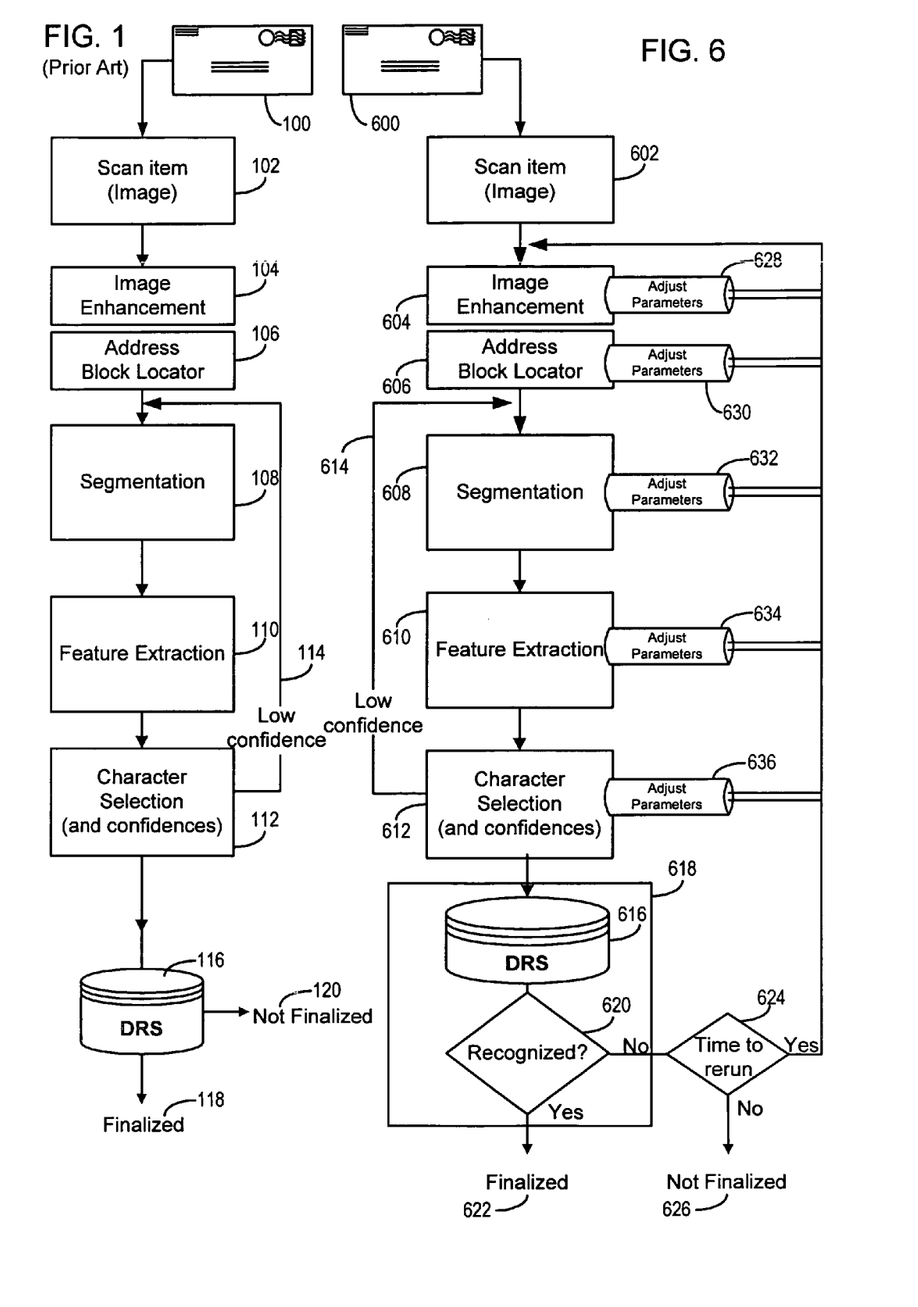
FIG. 1 illustrates a character recognition system typical of the prior art.
FIG. 6 schematically illustrates an iterative character recognition system, consistent with the present invention, implementing a self-orthogonal character recognition engine and employing a directory retrieval system for external validation of proposed result strings.

FIG. 1 represents an optical character recognition method consistent with the prior art. An input piece 100 is depicted as a standard mail envelope. The input piece 100 is then scanned 102 or undergoes a similar digital capture method. The scanned image is 102 undergoes image enhancement 104, and the address block of the input piece 100 is then located 106 on the scanned image. The processing then continues with a set character recognition routine involving subroutines such as a segmentation 108, feature extraction 110, and character selection subroutine 112. In a typical prior art character recognition method, character selection includes a confidence indication for the potential characters. If the character selection process 112 indicates a confidence indication that is too low 114, the process of character recognition can be repeated beginning with re-conducting the segmentation step 108. This prevents the segmentation subroutine from producing a result with an unacceptably low confidence indication (such as may occur when one character is segmented into two unrecognizable pieces).

Once the system determines a result string (preferably with an acceptable confidence indication), the result string is then sent to a database 116. The records in the database 116 are either used to finalize the character string 118, or fail to finalize the character string 120. In the prior art configuration, the database 116 finalizes a character string by returning a corrected result, including either an 11, 5 or 0 digit zip code. The database 116 processes the character string supplied by the character recognition method according to fuzzy logic, with consideration given to the confidence of the characters recognized in the character string (from step 112). If the fuzzy logic employed by the database 116 is not able to generate a record or resolve the character string offered by the character recognition method, the result is not finalized and the mail piece address or other information being processed cannot be corrected. It must then be handled in the alternative method, such as by hand sorting. The database 116 is typically supplied by a third party vendor, and it operates independent of the character recognition process. The character recognition process is handled by a host computer that simply sends a validation request to a separate computer (with direct access to the database). The second computer then pings the database to finalize or fail to finalize the generated character string.

Embodiments of the present invention depart from the paradigm of the prior art through implementation of a self-orthogonal character recognition engine. The self-orthogonal character recognition engine uses iterative processing to improve the accuracy of results. Result strings should be accurate enough to be recognized by database of valid character strings (sometimes using fuzzy matching logic).

Figure 2:
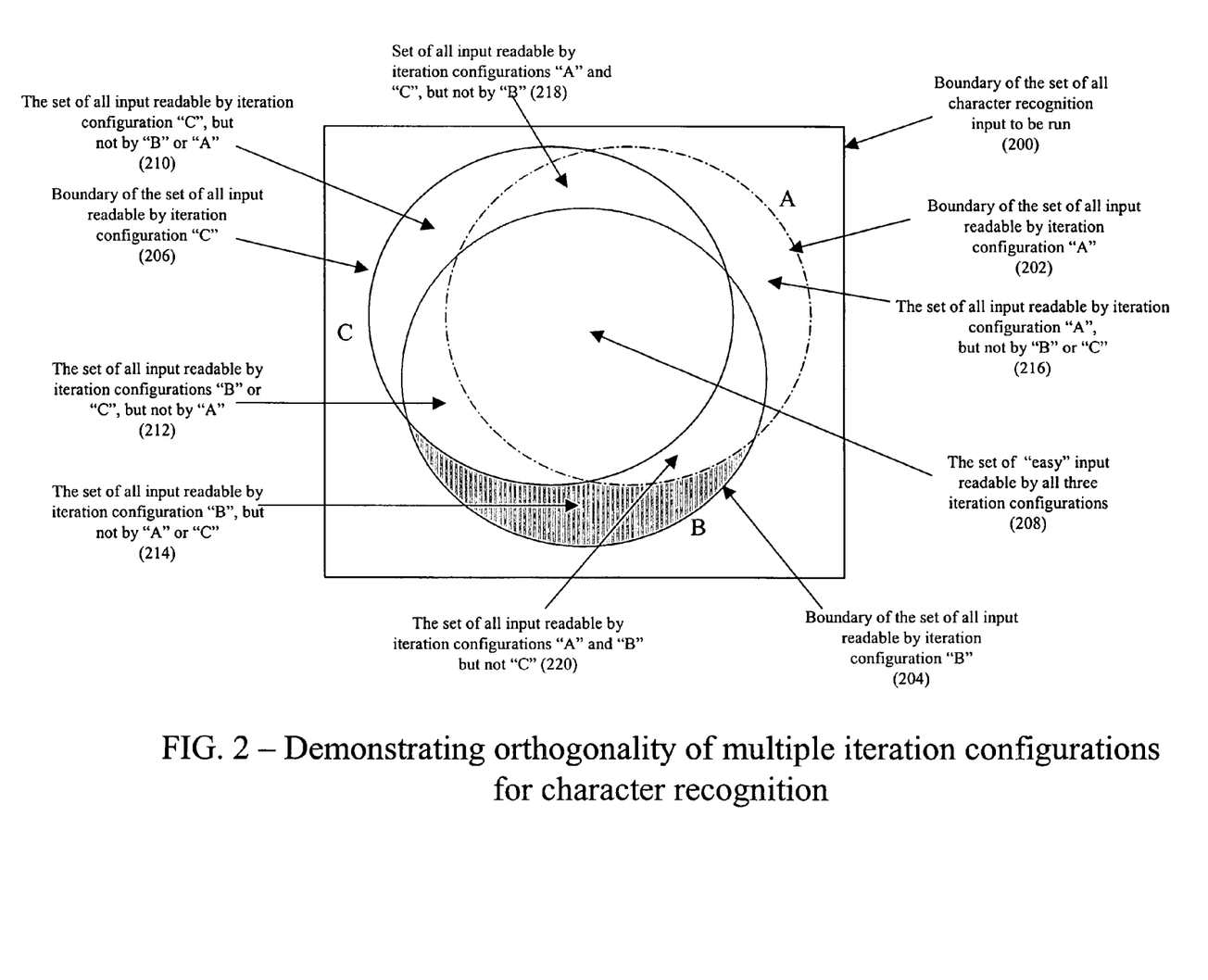
FIG. 2 illustrates the concept of orthogonality with a Venn diagram.

The concept of orthogonality is illustrated in FIG. 2. FIG. 2 depicts a square region 200 indicating the boundary for all input pieces contained in an input stream to be recognized with the self-orthogonal engine. FIG. 2 also illustrates orthogonality with respect to three different configurations or iterations of the self-orthogonal engine. The boundary of the set of all images readable with the first iteration, "A", is depicted by circle 202 in the Venn diagram. Similarly, the boundary of the set of all images readable by the second iteration configuration 204 is illustrated by circle "B", and the boundary of the set of all images readable by the third iteration configuration, is indicated by circle "C" 206.

Section 208 of the Venn diagram indicates the set of easy input piece images, which are readable by all three iteration configurations. Section 210 indicates the images that are readable by configuration "C" but not by configurations "B" or "A". Section 212 indicates the images readable by configurations "B" and "C" but not by configuration "A". Section 214 indicates the images readable by configuration "B" but not by configurations "A" or "C". Section 216 indicates the images readable by configuration "A" but not by configurations "B" or "C". Section 218 indicates the images readable by configurations "A" and "C" but not by configuration "B" and section 220 indicates the images readable by configurations "A" and "B" but not by configuration "C". As can readily be ascertained from FIG. 2, the union of images readable by all three iterative configurations combined encompasses a greater portion of the boundary set of all OCR input pieces 200 than that encompassed by any of the three iteration configurations operating independently. Through implementing this concept of orthogonal technology, the present invention can accurately recognize a greater proportion of the input stream than if it operated only under an optimized configuration.

Figure 3:
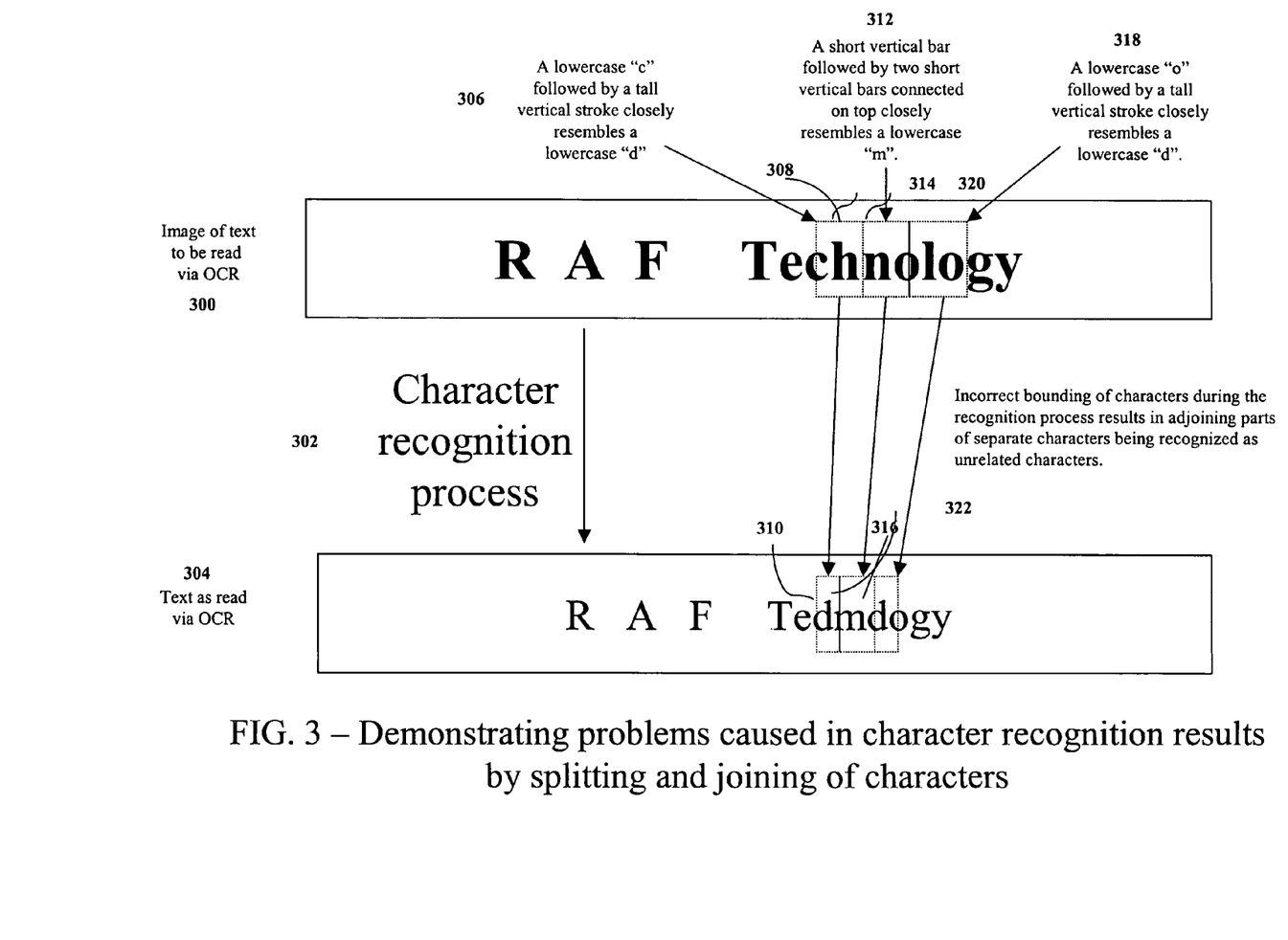
FIG. 3 illustrates errors commonly found in character recognition processing.
Figure 4:
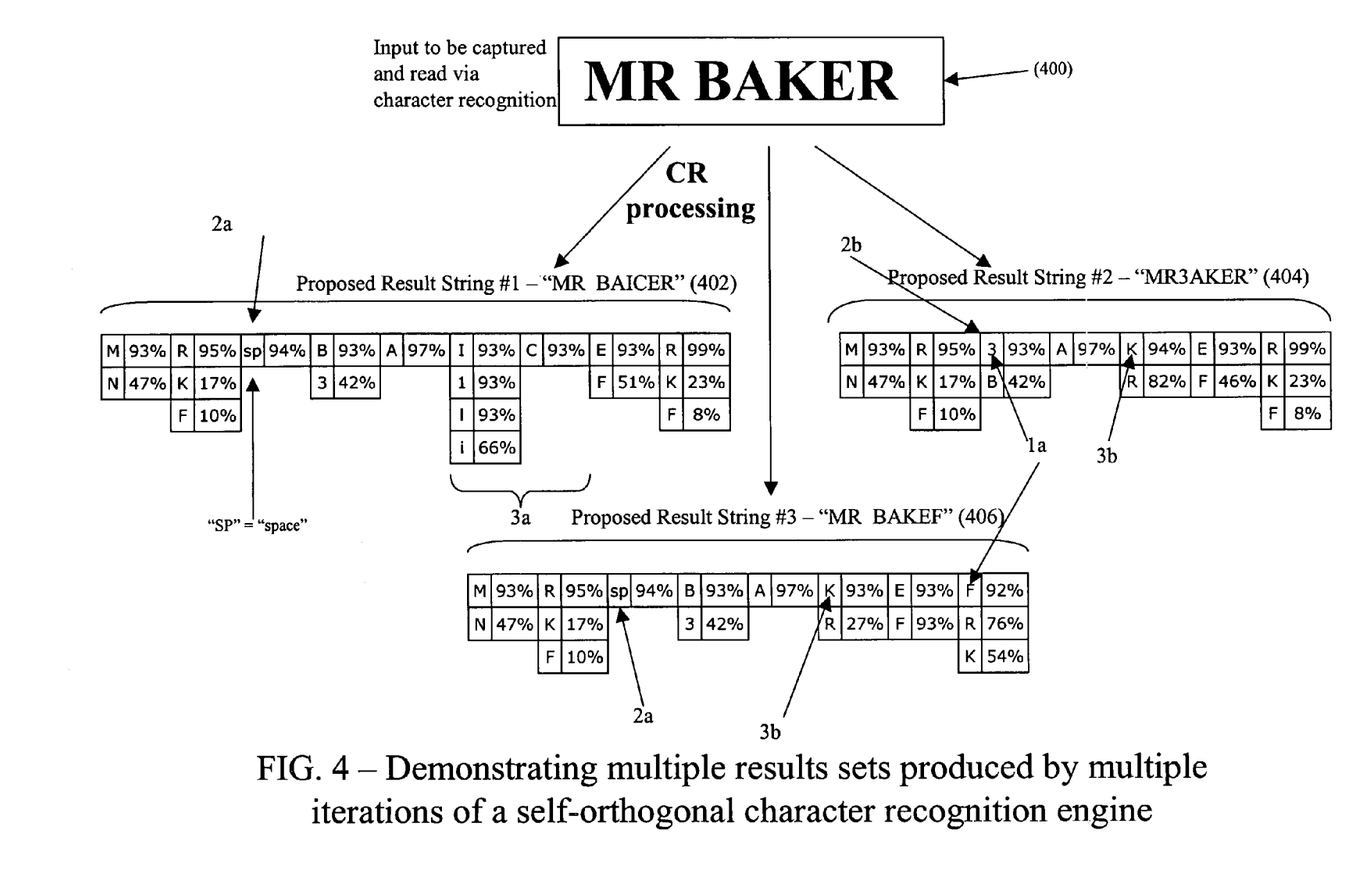
FIG. 4 illustrates the concept of using multiple result sets generated from separate iterations of a self-orthogonal character recognition engine to generate proposed result strings.
Figure 5:
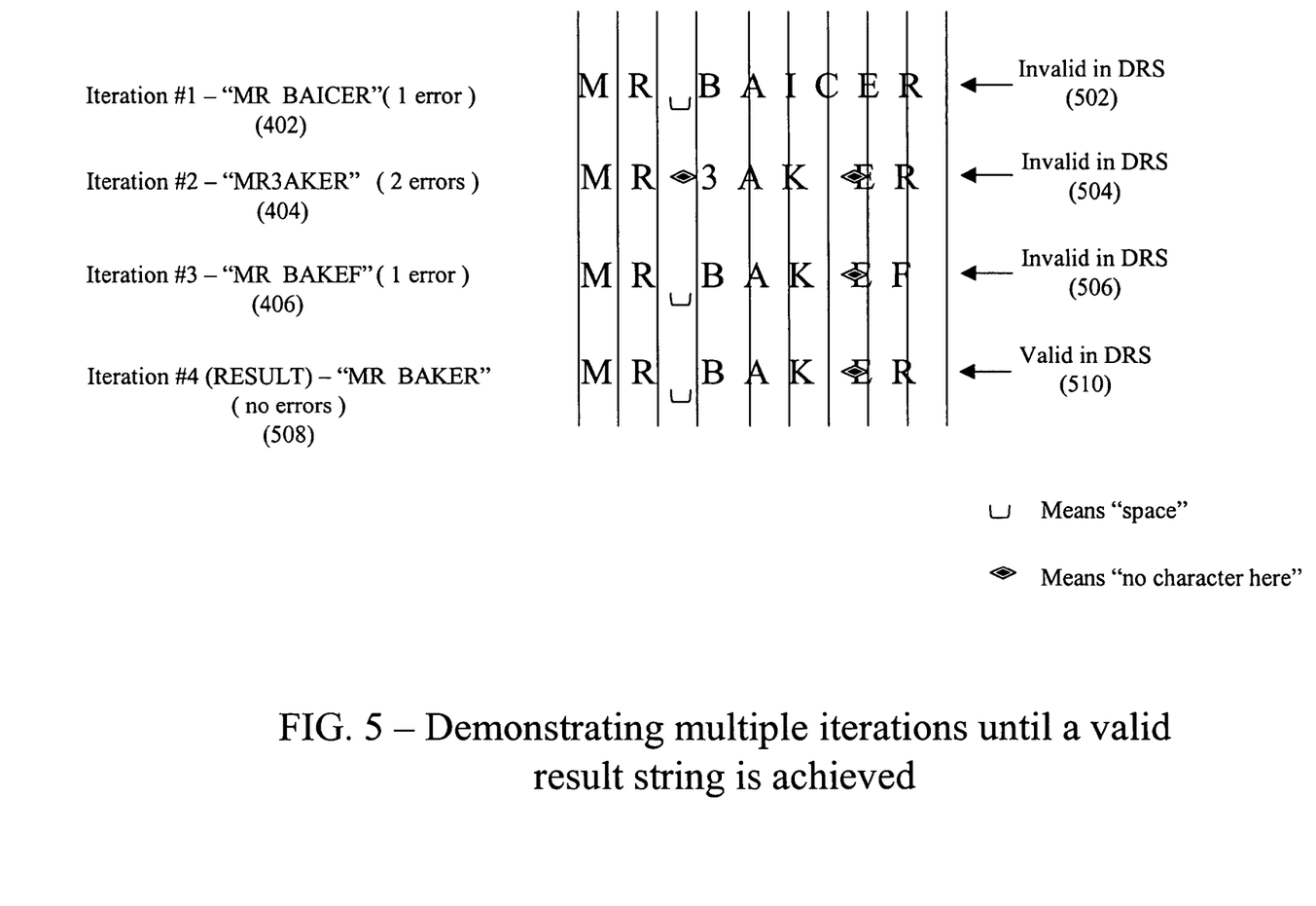
FIG. 5 illustrates conducting successive iterations to generate proposed result strings of FIG. 4 until a verified result string is obtained.

FIGS. 3 through 5 illustrate how a self-orthogonal character recognition engine can use multiple iterations to verify proposed character strings until a final result string is determined through validation by the database of acceptable character strings.

FIG. 3 illustrates errors typically encountered in a character recognition process. The image of text to be read 300 can encounter any of several potential types of errors in an OCR process 302 generating a result string 304. For example, depending on the type of font or printing being used, one type of error 306 is that a lower case "c" followed by a tall vertical stroke 308 closely resembles a lower case "d" 310. Another type of error 312 is that a short vertical bar followed by two short vertical bars connected on top 314 closely resembles a lower case "m" 316. A third example of a common recognition error 318 is that a lower case "o" followed by a tall vertical stroke 320 closely resembles a lower case "d" 322. These errors primarily illustrate difficulties with the segmentation portion of the character recognition process. Segmentation refers to the delineation of the spaces between and surrounding each independent character. Incorrect bounding of characters during the recognition process often results in adjoining parts of separate characters being recognized as unrelated characters.

FIG. 4 illustrates proposed character strings generated by three separate iteration configurations of a self-orthogonal engine. Each of these iterations displays at least one recognition error. The original character string 400 illustrates a name "MR BAKER." The first iteration produces the proposed string "MR BAICER" 402. The second iteration produced the proposed result string "Mr3aker" 404. The third iteration produces the proposed result string "MR BAKEF" 406. As illustrated in FIG. 4, none of the first three iterations produces an entirely correct representation of the input string 400. Also, the three iterations 402, 404, and 406, illustrate how differing configurations in the self-orthogonal character recognition engine can recognize the characters of the same image in different ways. For example, proposed result strings 402 and 406 include a space 2a, while proposed result string 404 lacks a space 2b. Another type of error is a substitution error 1a, whereby one character is substituted for a character with a similar appearance during the recognition process. Another type of error occurs with incorrect segmentation, which may cause multiple characters to be recognized as a single character or a single character to be recognized as multiple characters. This is illustrated in proposed result strings 402 and 404. The letter "K" correctly recognized 3b in string 404 is incorrectly recognized 3a as an "I" and a "C" in string 402. These and other errors may be commonly encountered during a recognition process.

To account for and correct recognition errors, the present invention incorporates a database of acceptable character strings. In a preferred embodiment of the invention functioning in the mail processing context, the database includes predetermined character strings that represent known mailing addresses. This database can be supplied from any of numerous third party vendors known in the mail processing field. These types of databases are also commonly referred to as a directory retrieval system (DRS). FIG. 5 illustrates the use of a DRS in an iterative process employed by the self-orthogonal character recognition system of the present invention. The first three iterations 402, 404 and 406 correspond to the proposed result strings from FIG. 4. As illustrated in FIG. 5, when the first proposed result string 402 not validated by the DRS 502, a second iteration is conducted with a second configuration to produce the second proposed result string 404. When the second proposed result string 404 is not validated by the DRS 504, a third iteration produces a third proposed result string 406. When the third proposed result string is not validated by the DRS 506, a fourth iteration is carried at which produces a fourth proposed result string 508. The most recent proposed result string 508 is selected as the validated result string when it is validated by the DRS 510.

The step of validating a proposed result string with the DRS includes comparing the proposed result string with the predetermined character strings stored in the DRS database. This comparison is determined by the functionality included in the DRS by the DRS manufacturer, and may include fuzzy matching logic. If fuzzy matching logic is included, the DRS may return a corrected result string from among the predetermined character strings for a proposed result string even if the proposed result string has one or more errors. For example, in multi-line character recognition processing for mailing addresses, an address on an envelope may have a correct name, but an outdated address, due to the addressee moving. Although the address stored in the DRS (the correct current address) may not match what is on the envelope, the name on the envelope may match with sufficient confidence that the DRS can return the corrected address. The proposed result string only has to be close enough to the predetermined character string to be identified by the DRS. With reference to FIG. 5, while the second proposed result string 404 may be sufficiently erroneous that it is not finalized by the DRS, other result strings, such as the fourth string 508 (and maybe even the third string 406) may be finalized using fuzzy matching logic employed by the DRS.

FIG. 6 schematically illustrates an embodiment of the present invention in the context of a mail processing system.

Similar to FIG. 1, FIG. 6 begins with a mail piece 600 (similar to the mail piece 100 of FIG. 1 being scanned or otherwise captured as a digital representation 602. The digital representation 602 is next subjected to a predetermined recognition routine. The predetermined recognition routine includes one or more sub-routines for conducting character recognition processing. As those skilled in the art will realize, the number or type of sub-routines incorporated in the predetermined recognition routine may vary depending on the context in which the self-orthogonal engine is being used or the type of input piece 600 for which the character recognition processing is being conducted. Fewer, additional, or alternate sub-routines may be used in place of the sub-routines illustrated in FIG. 6. The predetermined recognition routine in FIG. 6 is a preferred embodiment for use in mail processing.

After the digital representation has been obtained 602, the digital representation 602 undergoes image enhancement 604. The image enhancement step 604 fixes problems that have to do with image skew or other problems that are encountered in the digital capture step 602. After the enhancement step 604, a mail piece 600 undergoing charter recognition proceeds with an address block locator step 606. The purpose of the address block locator is to identify the portion of the image on which the multi-line character string is located. In a preferred embodiment, the steps of image enhancement and address block location may be subdivided or repeated to allow for finer processing control. For example, rough initial image enhancement can be followed by address block location. After the address block has been located, more detailed image enhancement can occur.

Having located the character strings to be processed, the present method continues with segmentation 608 and feature extraction 610. These steps are followed by character selection and designation of confidence levels for these selected characters 612. Similar to the prior art method illustrated in FIG. 1, if the characters selected in step 612 have low confidence levels (below a predetermined threshold of confidence) an internal iteration step 614 can return the process to the segmentation step and re-conduct the segmentation 608 and feature extraction 610 to select a new character 612 with a confidence level above the predetermined threshold. Once the characters have been recognized and concatenated into a proposed result string, the host computer operating the recognition routine queries the database 616 to determine if the proposed result string can be identified as any of the predetermined charter strings stored in the database 616 (indicating acceptable character string results). This is illustrated by decision step 620 in FIG. 6. If the proposed result string is recognized as a predetermined character string in the database, the result is finalized 622 as a validated result string. If it is not recognized in step 620, the process continues with decision step 624 in which the system determines if there is time to re-run the recognition routine. If there is not time to re-run the recognition routine, the process ends with the proposed character string not being finalized as a valid result string 626. If the decision 624 is made that there is time to re-run the recognition routine, the process continues by adjusting a parameter setting 628, 630, 632, 634 or 636 for one or more of the sub-routines 604, 606, 608, 610, or 612, respectively, comprising the predetermined recognition routine.

As is readily ascertainable to those skilled in the art, a self-orthogonal character recognition engine implementing a iteration method of the present invention provides designers of character recognition systems increased flexibility compared to prior art systems. The flexibility results from the amount of permutations possible in the various system configurations enabled through the multiple iterations and adjustable parameter settings. The designer of an OCR system consistent with the present invention can control the number of iterations possible. This is done by supplying a termination condition for the system. A number of termination considerations, as well as multiple termination considerations, can be built into a system. One example of a termination condition is the occurrence of a proposed result string being validated by the DRS. Another example of a termination condition is the occurrence of a system time-out. The time-out for the system can be programmed depending on the amount of time given to process each input piece of mail. If the designated time has expired, the system times out and the character string is not finalized. The amount of iterations performed within the period allocated for processing depends on the processing capacity or speed of the host computer running the character recognition system. As processing speeds increase with the improvements of technology, hardware, and software, more iterations will be accomplished in the given time limits. Another example of a termination condition can be the system completing a predetermined number of iterations. The system designer can predetermine the number or type of iterations performed.

One aspect of the present invention is that it allows character recognition system designers to specify or predetermine the sub-routine components comprising the character recognition routine. Further, designers can specify alternative parameter settings for each sub-routine. Greater design flexibility is also achieved by allowing character recognition system designers to specify initial parameter settings for each of the sub-routines, as well as sequential parameter settings used for subsequent iterations with the self-orthogonal character recognition engine. In a preferred embodiment, the host computer operating the self-orthogonal character recognition engine is provided a configuration file. The configuration file can be a text file, or it can be a computer program in any suitable programming language. A preferred embodiment incorporates a configuration file that maps the initial and subsequent parameters for use in each iteration of the self-orthogonal engine. The initial parameter settings define an optimized configuration for the character recognition engine to capture as many of the input pieces as possible on the first iteration. These optimized initial parameter settings can be determined empirically or theoretically. For each subsequent iteration, a preferred embodiment alters a parameter setting for one subroutine at a time. A self-orthogonal character recognition system could also be designed to vary multiple parameter settings on each iteration, which would significantly increase the number of system configuration permutations available for each iteration.

For each new iteration, the parameter settings are preferably altered so as to maximize the orthogonality of system configuration for each independent iteration. One way to determine which parameter settings maximize the orthogonality of the system, in addition to determining the optimized initial parameter settings, is to operate the system on a batch of sample input pieces to obtain empirical data.

A preferred embodiment of the present invention may employ a character recognition routine comprising several recognition subroutines. However, successive iterations may be defined so that the parameter settings of some subroutines are altered more than the parameter settings of other sub-routines. For example, one preferably altered subroutine is use of a particular character set to select candidate characters and their corresponding confidence levels. Character sets are collections of definitions of how each character should look in the digital representation. For example, a character set will define a particular arrangement of pixels that may appear in the digital representation of the character string as a "A." A different arrangement of pixels is defined to be a "B," and so on. A different character set can be constructed for each scenario one expects to encounter during the recognition process. For example, one character set can represent characters printed with a dot matrix printer. A different character set can be for high-quality printing of a particular font, such as CG Times. Another aspect of designating a character set is determining what characters are included in the set. For example, a character set may include only numbers. Alternatively, a character set may only include capital letters, or it may include a mix of capital and lower case letters.

In addition to the selection of a character set, another parameter setting that can be commonly varied is the character segmentation subroutine. Initial segmentation may assume a particular aspect ratio, width for each character, or number of characters per inch. An alternative segmentation parameter setting may alter any of these numbers. Further, alternative parameter settings do not have to be purely numeric. A preferred embodiment uses Boolean values as well. For example, a heuristic algorithm can be used as part of segmentation. If the confidence level associated with the results string is below a predetermined threshold, the system re-segments the digital representation of the character string with a different assumed individual character width. This heuristic algorithm can be toggled on or off as a Boolean "true" or "false" value. The following table illustrates an example of a partial mapping for a configuration file designating parameter settings for successive iterations:

| Iterative Step | Character Set | Expect Lower Case Letters? | Segmentation Heuristic Algorithm? | Aspect Ratio |
|---|---|---|---|---|
| Initial, optimized parameter settings | CS1 | Yes | Yes | 5 |
| First Iteration | CS2 | Yes | Yes | 5 |
| Second Iteration | CS2 | No | Yes | 5 |
| Third Iteration | CS2 | No | No | 5 |
| Fourth Iteration | CS2 | No | No | 3 |
| (n)th Iteration | ... | ... | ... | ... |

The above table can be extended for as many iterations as are desirable (or possible) within the processing time allotted. The iterations may also be terminated before reaching the end of the table if a valid result string is identified and the occurrence of a valid result string is designated as a terminating condition for the process.

Parameter setting alternatives can also be illustrated with respect to the address block location subroutine of the recognition routine. For example, Boolean parameter settings can be toggled on or off for ignoring portions of the image (such as where a stamp is typically located), expecting a degree of space between lines, conducting de-skewing procedures, allowing for different font types of sizes to be included in a multi-line character string (which may require combining character sets), or attempting to widen individual pixel representations so as to have discrete sections of a dot matrix character combined into a more easily identifiable character representation. Numeric parameter setting scan also be used, such as to incorporate a numeric aspect ratio, a certain amount of filtering of scanning noise (such as speckles below a predetermined dots per inch threshold), or incorporate a boarder of a measured pixel width around the perimeter of the mail piece image.

Another example of a subroutine that can be altered is a subroutine with alternate parameters that either attempt to recognize handwritten characters or printed characters. In fact, the vast number or type of possible permutations in recognition subroutine parameter settings is a major advantage of the present invention over the prior art. Alternative parameter settings can be established for practically any subroutine that may be included in a character recognition routine. A configuration file can designate which of the alternate parameter settings are implemented in each iteration of the self-orthogonal character recognition engine.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An iterative character recognition method employing a database of predetermined character strings, the method comprising the steps of:
   (a) receiving a digital representation of a character string;
   (b) generating a proposed result string by applying a predetermined recognition routine to the received digital representation, the predetermined recognition routine including a recognition subroutine employing an initial parameter setting;
   (c) determining whether the proposed result string matches any of the predetermined character strings;
   (d) if the proposed result string does not match any of the predetermined character strings, adjusting the initial parameter setting of the recognition subroutine; and then
   (e) repeating steps (b) and (c) to generate a next proposed result string and to determine whether the next proposed result string matches any of the predetermined character strings.

2. The method of claim 1 further including the step of repeating steps (d) and (e) until reaching a termination condition.

3. The method of claim 2 wherein the termination condition is the proposed result string matching any of the predetermined character strings.

4. The method of claim 2 wherein the termination condition is an expiration of a predetermined duration of time.

5. The method of claim 2 wherein the termination condition is a completion of a predetermined number of repetitions of steps (d) and (e).

6. The method of claim 2 wherein the predetermined recognition routine is a magnetic ink character recognition routine.

7. The method of claim 2 wherein the predetermined recognition routine is an optical character recognition routine.

8. The method of claim 7 wherein the optical character recognition routine is a multi-line optical character recognition routine.

9. The method of claim 7 wherein:
   the optical character recognition routine is for mail processing;
   the character string is a mailing address; and
   the predetermined character strings are known mailing addresses.

10. The method of claim 9 wherein the recognition subroutine is chosen from a group consisting of an address block location subroutine, an image enhancement subroutine, a segmentation subroutine, a feature extraction subroutine, a character selection subroutine, a confidence subroutine, and a handwriting recognition subroutine.

11. The method of claim 10 wherein:
the recognition subroutine is the character selection subroutine;
the initial parameter setting references a first character set; and
the adjusted parameter setting references a second character set.

12. The method of claim 10 wherein:
the recognition subroutine is the address block location subroutine;
the initial parameter setting is a first Boolean value instructing whether to use a predefined address block location assumption; and
the adjusted parameter setting is a second Boolean value instructing whether to use the predefined address block location assumption.

13. The method of claim 10 wherein:
the recognition subroutine is the segmentation subroutine;
the initial parameter setting is a first Boolean value instructing whether to use a heuristic segmentation algorithm; and
the adjusted parameter setting is a second Boolean value instructing whether to use the heuristic segmentation algorithm.

14. The method of claim 1 wherein adjusting the initial parameter setting includes selecting a next parameter setting.

15. The method of claim 1 wherein the step of determining the proposed result string match includes using fuzzy logic.

16. The method of claim 1 wherein the digital representation is a digital image.

17. A method for defining an iterative character recognition routine for use in a self-orthogonal character recognition engine, the method comprising the steps of:
designating a recognition subroutine for inclusion in the recognition routine;
selecting a first parameter setting and a second parameter setting for the recognition subroutine;
securing access to a database of acceptable result strings; and
implementing control logic whereby the first parameter setting is used to generate a first proposed result string, the first proposed result string is matched against the acceptable result strings in the database, and, if the first proposed result string does not match the acceptable result strings in the database, the second parameter setting is used to generate a second proposed result string.

18. A self-orthogonal character recognition engine embodied in a computer-readable medium, comprising:
a character recognition routine for selecting a result string, the character recognition routine being operable to invoke:
a recognition subroutine having a plurality of parameter settings for processing an input string, the recognition subroutine being operable to employ the plurality of parameter settings, one at a time according to a designated order of use, to generate a corresponding plurality of proposed result strings;
a configuration file designating the order of use for the plurality of parameter settings; and
an interface for validating each of the corresponding plurality of proposed result strings against a database of acceptable result strings to thereby generate a validated proposed result string. the character recognition routine being operable to select as the result string the validated proposed result string.

19. The character recognition engine of claim 18 wherein the database of acceptable result strings is operated independent of the self-orthogonal character recognition engine.

20. The character recognition engine of claim 18 wherein the database of acceptable result strings is external to the self-orthogonal character recognition engine.

21. The method for defining an iterative character recognition routine according to claim 17 wherein:
the designated subroutine comprises an image enhancement subroutine; and
the first and second parameter settings adjust operation of the image enhancement subroutine.

22. The method for defining an iterative character recognition routine according to claim 17 wherein:
the designated subroutine comprises an address block locator subroutine; and
the first and second parameter settings adjust operation of the address block locator subroutine.

23. The method for defining an iterative character recognition routine according to claim 17 wherein:
the designated subroutine comprises a segmentation subroutine; and
the first and second parameter settings adjust operation of the segmentation subroutine.

24. The method for defining an iterative character recognition routine according to claim 17 wherein:
the designated subroutine comprises a feature extraction subroutine; and
the first and second parameter settings adjust operation of the feature extraction subroutine.

25. The method for defining an iterative character recognition routine according to claim 17 wherein:
the designated subroutine comprises a character selection subroutine; and
the first and second parameter settings adjust operation of the character selection subroutine.

26. An iterative mail piece address string recognition method employing a database of predetermined valid address strings, the method comprising the steps of:
(a) scanning a mail piece to form an image of the mail piece;
(b) locating an address block portion of the image;
(c) generating a proposed address string based on the located address block, by applying a predetermined recognition routine including a recognition subroutine having an initial parameter setting;
(d) determining whether the proposed address string matches any of the predetermined valid address strings in the database;
(e) if the proposed address string does not match any of the predetermined valid address strings, adjusting the initial parameter setting of the recognition subroutine; and then
(f) repeating steps (c) and (d) to generate a next proposed address string and to determine whether the next proposed address string matches any of the predetermined valid address strings in the database.

* * * * *

UNITED STATES PATENT AND TRADEMARK OFFICE
CERTIFICATE OF CORRECTION

PATENT NO. : 7,031,519 B2  
APPLICATION NO. : 09/919586  
DATED : April 18, 2006  
INVENTOR(S) : Brian J. Elmenhurst It is certified that error appears in the above-identified patent and that said Letters Patent is hereby corrected as shown below:

In Column 4, Line 22, delete "is".

In Column 4, Line 66, after "by", insert --a --.

In Column 5, Line 65, change "produced" to --produces--.

In Column 6, Line 33, before "not", insert --is--.

In Column 6, Line 39, change "at" to --out--.

In Column 7, Line 47, change "charter" to --character--.

In Column 7, Line 64, change "a" to --an--.

In Column 9, Line 64, change "setting scan" to --settings can--.

In Column 10, Line 1, change "boarder" to --border--.

In Column 10, Line 21, after "character", add --string --.

Signed and Sealed this

Twenty-ninth Day of August, 2006

JON W. DUDAS  
*Director of the United States Patent and Trademark Office*